(12) United States Patent
Li et al.

(10) Patent No.: US 10,372,206 B2
(45) Date of Patent: Aug. 6, 2019

(54) EYE-CONTROLLED APPARATUS, EYE-CONTROLLED METHOD AND EYE-CONTROLLED SYSTEM

(71) Applicant: BOE Technology Group Co., Ltd., Beijing (CN)

(72) Inventors: Wenbo Li, Beijing (CN); Tian Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 44 days.

(21) Appl. No.: 15/511,861

(22) PCT Filed: Apr. 14, 2016

(86) PCT No.: PCT/CN2016/079259
§ 371 (c)(1),
(2) Date: Mar. 16, 2017

(87) PCT Pub. No.: WO2016/188258
PCT Pub. Date: Dec. 1, 2016

(65) Prior Publication Data
US 2017/0293357 A1    Oct. 12, 2017

(30) Foreign Application Priority Data
May 27, 2015  (CN) .......................... 2015 1 0280294

(51) Int. Cl.
*G06F 3/01* (2006.01)
*G06F 3/14* (2006.01)

(52) U.S. Cl.
CPC ............ *G06F 3/013* (2013.01); *G06F 3/14* (2013.01); *G09G 2320/0261* (2013.01); *G09G 2354/00* (2013.01)

(58) Field of Classification Search
None
See application file for complete search history.

(56) References Cited

U.S. PATENT DOCUMENTS

| 2013/0176208 A1 | 7/2013 | Tanaka et al. |
| 2013/0176308 A1 | 7/2013 | Mueller |

FOREIGN PATENT DOCUMENTS

| CN | 102176755 | 9/2011 |
| CN | 102981620 A | 3/2013 |

(Continued)

OTHER PUBLICATIONS

Third Office Action, including Search Report, for Chinese Patent Application No. 201510280294.2, dated Apr. 17, 2018, 14 pages.

(Continued)

*Primary Examiner* — Nicholas J Lee
(74) *Attorney, Agent, or Firm* — Westman, Champlin & Koehler, P.A.

(57) ABSTRACT

The present disclosure discloses an eye-controlled apparatus, an eye-controlled method and an eye-controlled system. The eye-controlled apparatus includes a fixation point acquisition unit, a human eye action detection unit and a control signal generation unit. The fixation point acquisition unit is configured to acquire position information about the fixation point of human eyes on a device to be operated. The human eye action detection unit is configured to detect whether the human eyes take a pre-set action, and control the fixation point acquisition unit to transmit current position information about the fixation point of the human eyes on the device to be operated to the control signal generation unit when detecting the preset action taken by the human eyes. The control signal generation unit is configured to generate, based on a pre-stored position control correspondence table corresponding to the device to be operated, a control signal corresponding to the current position information about the fixation point of the human eyes on the device to be operated, and transmit the control signal to the device to be operated so as to control the device to be operated to execute a corresponding operation. The eye-controlled apparatus, the (Continued)

eye-controlled method and the eye-controlled system may effectively control the device to be operated using human eyes.

19 Claims, 4 Drawing Sheets

(56) References Cited

FOREIGN PATENT DOCUMENTS

| CN | 103324290 | 9/2013 |
|---|---|---|
| CN | 103500061 | 1/2014 |
| CN | 103703438 | 4/2014 |
| CN | 103838372 | 6/2014 |
| CN | 104348969 A | 2/2015 |
| CN | 104866100 | 8/2015 |
| WO | WO 2013/133618 | 9/2013 |

OTHER PUBLICATIONS

Office Action, including Search Report, for Chinese Patent Application No. 201510280294.2, dated May 15, 2017, 19 Pages.
Second Office Action, including Search Report, for Chinese Patent Application No. 201510280294.2, dated Nov. 16, 2017, 19 pages.
International Search Report (English translation) and Written Opinion of International Application No. PCT/CN2016/079259, dated Jul. 15, 2016.
English translation of Box No. V of the Written Opinion for the International Searching Authority for International Application No. PCT/CN2016/079259.

EYE-CONTROLLED APPARATUS, EYE-CONTROLLED METHOD AND EYE-CONTROLLED SYSTEM

CROSS-REFERENCE TO RELATED APPLICATIONS

This application is a Section 371 National Stage Application of International Application No. PCT/CN2016/079259, filed on Apr. 14, 2016, entitled "Eye-Controlled Apparatus, Eye-Controlled Method and Eye-Controlled System", which claims priority to Chinese Application No. 201510280294.2, filed on May 27, 2015, incorporated herein by reference in their entirety.

BACKGROUND OF THE INVENTION

Field of the Invention

The present invention relates to a technical filed of display, more particularly, relates to an eye-controlled apparatus, an eye-controlled method and an eye-controlled system.

Description of the Related Art

Exploring a natural and harmonious human-computer relationship is becoming more and more important in computer field. A natural, efficient and intelligent human-computer interaction interface is an important trend in the development of computer. However, for disabled people or those who are not idle for their hands (for example, being in activities such as washing their hands, cooking, eating, etc.), it is quite difficult for them to perform human-computer interaction by using input devices such as a mouse, a keyboard, an operator, etc.

In the field of human-computer interaction, since the eye is an important information exchanging channel and the sight line of the human may reflect attention direction of the human, the sight line applied to the field of human-computer interaction obtains the natural, direct and interactive features, thereby gaining many People's attention. How to realize human-computer interaction based on human eye action is an important research item in this field.

SUMMARY OF THE INVENTION

The present invention provides an eye-controlled apparatus, an eye-controlled method and an eye-controlled system, which may control the devices to be operated based on the action of the human eyes.

In order to realize the above-mentioned purpose, the present disclosure provides an eye-controlled apparatus, comprising:

a fixation point acquisition unit configured to acquire position information about the fixation point of human eyes on a device to be operated;

a human eye action detection unit configured to detect whether the human eyes take a preset action, and control the fixation point acquisition unit to output current position information about the fixation point of the human eyes on the device to be operated when detecting the preset action taken by the human eyes;

a control signal generation unit configured to generate, based on a pre-stored position control correspondence table corresponding to the device to be operated, a control signal corresponding to the current position information about the fixation point of the human eyes on the device to be operated, and transmit the control signal to the device to be operated so as to control the device to execute a corresponding operation, wherein position information on the device to be operated and the control signals each corresponding to each of position information are stored in the position control correspondence table.

Optionally, the fixation point acquisition unit comprises:

an infrared emission module provided on the device to be operated and adapted to emit infrared light to the human eyes and form light reflection points in two pupils of the human eyes;

a first human eye image acquisition module provided on the device to be operated and adapted to acquire an image of the human eyes;

an image processing module configured to establish an image coordinate system based on the image of the human eyes acquired by the first human eye image acquisition module, and process the image of the human eyes to obtain position coordinates of centers of the two pupils and of the light reflection points in the image coordinate system; and a calculation module configured to obtain the position information about the fixation point of the human eyes on the device to be operated by a cross ratio invariance algorithm based on the position coordinates of centers of the two pupils and of the light reflection points in the image coordinate system obtained by the image processing module.

Optionally, the infrared emission module comprises four infrared emission sources provided at four corners of the device to be operated respectively.

Optionally, the fixation point acquisition unit further comprises a correction module configured to correct the position information about the fixation point of the human eyes on the device to be operated according to a linear scaling algorithm.

Optionally, the image processing module and the calculation module are integrated in the device to be operated.

Optionally, the fixation point acquisition unit comprises:
spectacles;
a scene acquisition module provided on the spectacles and adapted to acquire a scene image seen by the human eyes through the spectacles, the scene image containing an image of the device to be operated;
a second human eye image acquisition module provided on the spectacles and adapted to acquire an image of the human eyes,
a fixation direction determination module configured to determine a fixation direction of the human eyes based on the image of the human eyes acquired by the second human eye image acquisition module; and
a fixation point determination module configured to determine the position information about the fixation point of the human eyes on the device to be operated based on the scene image acquired by the scene acquisition module and the fixation direction of the human eyes determined by the fixation direction determination module.

Optionally, the fixation direction determination module is configured to determine the fixation direction of the human eyes based on pupil positions in the image of the human eyes acquired by the second human eye image acquisition module.

Optionally, the preset action comprises keeping the position of the fixation point of the human eyes on the device to be operated unchanged for 2 to 3 seconds, or, blinking rapidly for 3 to 5 times within a preset time while keeping the position of the fixation point of the human eyes on the device to be operated unchanged.

Optionally, the human eye action detection unit is an apparatus having an imaging function.

Optionally, the human eye action detection unit is configured to acquire a real-time image of the human eyes by means of the first human eye image acquisition module or the second human eye image acquisition module, and obtain the action of the human eyes based on the real-time image of the human eyes.

In order to realize the above-mentioned purpose, the present disclosure also provides an eye-controlled system comprising a plurality of devices to be operated and an eye-controlled apparatus as mentioned above.

Optionally, when the fixation point acquisition unit in the eye-controlled apparatus comprises: the infrared emission module, the first human eye image acquisition module, the image processing module and the calculation module as mentioned above, the fixation point acquisition units in the eye-controlled apparatus have the same number as that of the devices to be operated, and are one-to-one corresponding to the devices to be operated; and each fixation point acquisition units is provided on a respective device to be operated.

Optionally, the human eye action detection units in the eye-controlled apparatus have the same number as that of the devices to be operated, and are one-to-one corresponding to the devices to be operated; and each human eye action detection units is provided on a respective device to be operated.

Optionally, all of the fixation point acquisition units are connected to one single control signal generation unit, which is adapted to store a plurality of position control correspondence tables corresponding to the devices to be operated, respectively, and transmit control information to each device to be operated.

Optionally, when the fixation point acquisition unit in the eye-controlled apparatus comprises: the spectacles, the scene acquisition module, the second human eye image acquisition module, the fixation direction determination module and the fixation point determination module as mentioned above, the eye-controlled apparatus comprises one fixation point acquisition unit; and the eye-controlled system further comprises a plurality of activation units one-to-one corresponding to the devices to be operated; each activation units is provided on a respective device to be operated, configured to activate the eye-controlled apparatus when the fixation point acquisition unit is directed to a device to be operated corresponding to the activation unit, and control the control signal generation unit to call the position control correspondence table corresponding to the device to be operated corresponding to the activation unit.

Optionally, the eye-controlled apparatus comprises one human eye action detection unit provided on the spectacles of the fixation point acquisition unit.

In order to realize the above-mentioned purpose, the present disclosure also provides an eye-controlled method performed based on an eye-controlled apparatus as mentioned above, the eye-controlled method comprising steps of:

by the fixation point acquisition unit, acquiring the position information about the fixation point of the human eyes on the device to be operated;

by the human eye action detection unit, detecting whether the human eyes take the preset action, and controlling the fixation point acquisition unit to transmit the current position information about the fixation point of the human eyes on the device to be operated to the control signal generation unit when detecting the preset action taken by the human eyes; and by the control signal generation unit, generating the control signal corresponding to the current position information about the fixation point of the human eyes on the device to be operated based on the pre-stored position control correspondence table corresponding to the device to be operated, and transmitting the generated control signal to the device to be operated to control the device to be operated to execute a corresponding operation, wherein the position information on the device to be operated and the control signals corresponding to the position information, respectively, are stored in the position control correspondence table.

Optionally, the eye-controlled method further comprises a step of: prior to acquiring the position information about the fixation point of the human eyes on the device to be operated by the fixation point acquisition unit, establishing the position control correspondence table corresponding to the device to be operated.

The technical solution disclosed in the present disclosure has the following advantages:

The present disclosure provides an eye-controlled apparatus, an eye-controlled method and an eye-controlled system, wherein the eye-controlled apparatus comprises a fixation point acquisition unit, a human eye action detection unit and a control signal generation unit. The fixation point acquisition unit is configured to acquire position information about the fixation point of the human eyes on a device to be operated; the human eye action detection unit is configured to detect whether the human eyes take a pre-set action, and control the fixation point acquisition unit to transmit current position information about the fixation point of the human eyes on the device to be operated to the control signal generation unit when detecting the preset action taken by the human eyes; and the control signal generation unit is configured to generate a control signal corresponding to the current position information about the fixation point of the human eyes on the device to be operated based on a pre-stored position control correspondence table corresponding to the device to be operated, and transmit the control signal to the device to be operated so as to control the device to be operated to execute a corresponding operation. The technical solution of the present invention may effectively utilize the human eyes to control a device to be operated.

DETAILED DESCRIPTION OF PREFERRED EMBODIMENTS OF THE INVENTION

The eye-controlled apparatus, the eye-controlled system and the eye-controlled method provided by the present invention will be described in detail hereinafter with reference to the accompanying drawings in order to provide a better understanding of the technical solution of the present invention by those skilled in the art.

Figure 1:
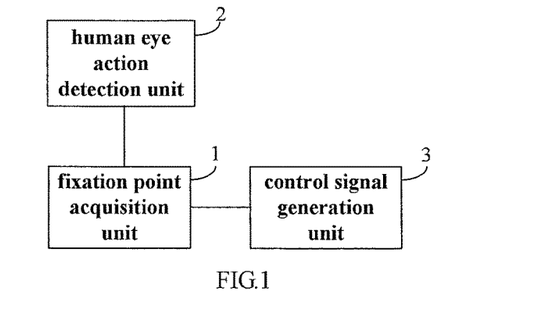
FIG. 1 is a schematic block diagram of an eye-controlled apparatus according to an embodiment of the present invention.

FIG. 1 is a schematic block diagram of an eye-controlled apparatus according to an embodiment of the present invention. As shown in FIG. 1, the eye-controlled apparatus comprises: a fixation point acquisition unit 1, a human eye action detection unit 2 and a control signal generation unit 3. The fixation point acquisition unit 1 is connected to the human eye action detection unit 2 and the control signal generation unit 3. The fixation point acquisition unit 1 is configured to acquire position information about the fixation point of human eyes on a device to be operated; and the human eye action detection unit 2 is configured to detect whether the human eyes take a pre-set action, and control the fixation point acquisition unit 1 to transmit current position information about the fixation point of the human eyes on the device to be operated to the control signal generation unit 3 when detecting the preset action taken by the human eyes; and the control signal generation unit 3 is configured to generate, based on a pre-stored position control correspondence table corresponding to the device to be operated, a control signal corresponding to the current position information about the fixation point of the human eyes on the device to be operated, and transmit the generated control signal to the device to be operated so as to control the device to be operated to execute a corresponding operation. It should be noted that the position information on the device to be operated and the control signals corresponding to position information, respectively, are stored in the position control correspondence table.

In the eye-controlled apparatus according to the embodiment, firstly, the position information about the fixation point of the human eyes on the device to be operated is acquired by the fixation point acquisition unit 1. Next, the human eye action detection unit 2 detects and determines whether the human eyes take a pre-set action, and controls the fixation point acquisition unit 1 to transmit the current position information about the fixation point of the human eyes on the device to be operated to the control signal generation unit 3 when detecting the preset action taken by the human eyes. Finally, the control signal generation unit 3 generates, based on the pre-stored position control correspondence table corresponding to the device to be operated, the control signal corresponding to the current position information about the fixation point of the human eyes on the device to be operated, and control the device to be operated to execute the corresponding operation based on the control signal, so as to implement the eye control.

It should be noted that the device to be operated in various embodiments of the present invention may comprise an electronic device such as a mobile phone, a touch display screen, a PAD (tablet), or the like. The "connection" in various embodiments of the present invention may comprise either a wired electrical connection or a wireless electrical connection, and is not limited thereto.

The specific operation for realizing eye control by the eye-controlled apparatus provided by the embodiment of the present invention will be described in detail with reference to some examples. It is assumed that the device to be operated is a touch display screen in which a plurality of soft keys with fixed positions are provided in the display area of the touch display screen and a plurality of physical keys with fixed position are provided in the peripheral area.

Figure 2:
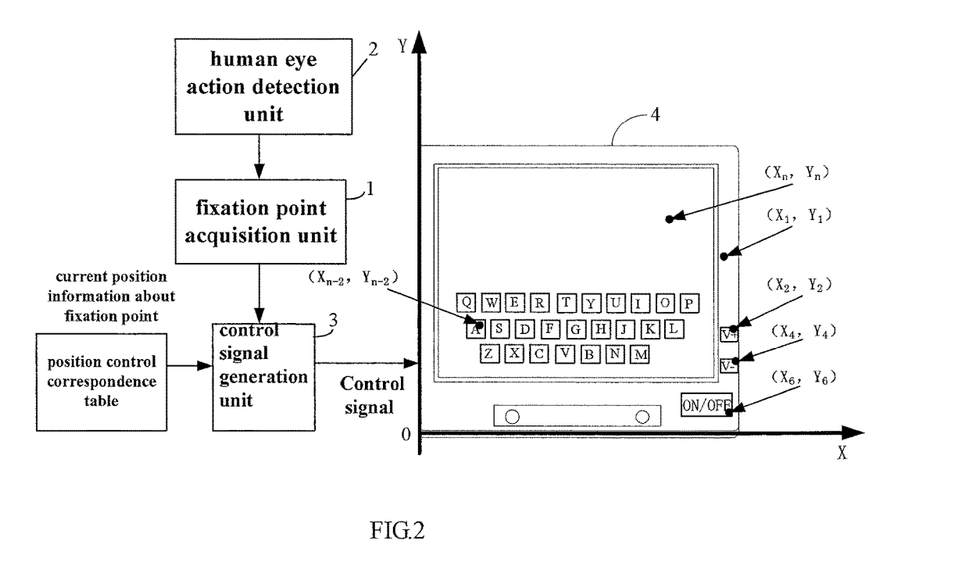
FIG. 2 is a schematic view of a particular application of the eye-controlled apparatus according to an embodiment of the present invention.

FIG. 2 is a schematic view of a particular application of the eye-controlled apparatus according to an embodiment of the present invention. It is easy to understand that a position control correspondence table corresponding to the touch display screen 4 should be established before the eye control operation is performed by the eye-controlled apparatus provided by the embodiment of the present invention. It should be noted that in the present embodiment, the position information in the position control correspondence table is specifically described as coordinate information by way of example. However, it should be understood by those skilled in the art that it is only exemplary embodiment to describe the position information in the present embodiment as the coordinate information, which does not limit the technical aspects of the embodiments of the present invention. In an embodiment of the present invention, any information that can be used to describe the specific position of the fixation point of the human eyes on the device to be operated may be used as the position information about the fixation point of the human eyes on the device to be operated.

In the present embodiment, when the position control correspondence table corresponding to the touch display screen 4 is established, the coordinate system may be established in such a way that a lower left corner of the touch display screen 4 is described as an origin point, a direction extending from the lower left corner of the touch display screen 4 to the lower right corner thereof is described as an X-axis, and a direction extending from the lower left corner of the touch display screen 4 to the upper left corner thereof is described as a Y axis. Then, the entire touch display screen 4 is coordinated so that n sampling points uniformly distributed and located at different positions may be provided on the entire touch display screen 4. Specifically, n sampling points at different positions may be provided on the touch display screen and constitute a sampling point array with a rows and b columns. The distances between any two sampling points adjacent to each other in the row direction or in the column direction in this sampling point array are equal to each other. It should be noted that the n sampling points should cover all the keys (soft keys and physical keys) on the touch display screen 4, that's to say, the area of each key (soft and physical keys) on the touch display screen 4 should include at least one sampling point. After setting the sampling points, each control signal is set to correspond to the position of each sampling point so as to generate the position control correspondence table corresponding to the touch display screen 4, and the position control correspondence table is stored in the control signal generation unit 3. An example of the generated position control correspondence table corresponding to the touch display screen 4 is shown in Table 1 below.

TABLE 1

| Position information | Control signal |
| --- | --- |
| $(X_1, Y_1)$ | Control signal for no operation |
| $(X_2, Y_2)$ | Control signal for Volume Up |
| $(X_3, Y_3)$ | Control signal for Volume Up |

TABLE 1-continued

| Position information | Control signal |
|---|---|
| $(X_4, Y_4)$ | Control signal for Volume Down |
| $(X_5, Y_5)$ | Control signal for Volume Down |
| $(X_6, Y_6)$ | Control signal for ON/OFF |
| ... | ... |
| ... | ... |
| $(X_{n-2}, Y_{n-2})$ | Control signal for inputting character A |
| $(X_{n-1}, Y_{n-1})$ | Control signal for no operation |
| $(X_n, Y_n)$ | Control signal for no operation |

Specifically, when the touch display screen 4 receives the control signal for no operation (i.e., on the touch display screen 4 is not provided with a corresponding key (soft key and physical key) at the current position of the fixation point of the human eyes), the touch display screen 4 does not perform any operation; when the touch display screen 4 receives the control signal for Volume Up, the touch display screen 4 will perform an operation of rising up the volume; and when the touch display screen 4 receives the control signal for inputting character "A", the touch display screen 4 will perform an operation of inputting the character "A" at a preset position on the display screen, and so on. They will not be illustrated one by one.

As can be seen from Table 1 above, one position information corresponds to only one control signal, whereas one control signal may correspond to two or more different position information. For example, the coordinate $(X_2, Y_2)$ and the coordinate $(X_3, Y_3)$ all correspond to the control signal for Volume Up, since some keys on the touch display screen 4 may be larger, and when there is a large number of sampling points, the key with larger size may cover two or more sampling points. In this case, when the fixation point of the human eyes on the touch display screen 4 falls at any of the two or more sampling points, it is determined that the user expects to make an operating on the key with larger size. For example, when the fixation point of the human eyes on the touch display screen 4 falls at least one of the sampling points with coordinate $(X_2, Y_2)$ and $(X_3, Y_3)$, it is possible to determine that the user expects to operate the Volume Up key.

The operation of the eye-controlled apparatus provided in the present embodiment will be described in detail with reference to FIG. 2 by taking that the eye-controlled apparatus is to control the touch display screen 4 to rise up the Volume according to the action of the human eyes as an example.

First, the user moves the fixation point on the touch display screen 4 to the area of the Volume Up key on the touch display screen 4. At this time, the fixation point acquisition unit 1 acquires the position information about the fixation point of the human eyes on the touch display Screen 4. For example, the coordinate of the fixation point of the human eyes on the touch display Screen 4 acquired by the fixation point acquisition unit 1 is coordinate $(X_2, Y_2)$ or $(X_3, Y_3)$. In the present embodiment, the coordinate obtained by the fixation point acquisition unit 1 being coordinate $(X_2, Y_2)$ will be described as an example.

Figure 3:
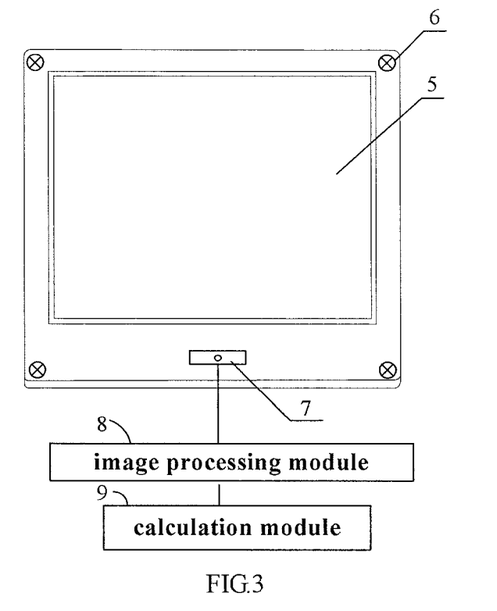
FIG. 3 is a schematic view of a fixation point acquisition unit in an eye-controlled apparatus according to an embodiment of the present invention.

FIG. 3 is a schematic view of the fixation point acquisition unit in the eye-controlled apparatus according to an embodiment of the present invention. As shown in FIG. 3, as an selectable structure of the fixation point acquisition unit in the eye-controlled apparatus according to the present embodiment (the structure is used in a case where the user does not wear glasses, i.e., the case of the naked eye), the fixation point acquisition unit 1 comprises: an infrared emission module 6, a first human eye image acquisition module 7, an image processing module 8 and a calculation module 9. The infrared emission module 6 is provided on the device to be operated 5, such as, the touch display Screen 4, and adapted to emit infrared light to the human eyes and form light reflection points in two pupils of the human eyes. Specifically, the infrared emission module 6 comprises four infrared emission sources uniformly distributed at four corners of the device to be operated 5. The first human eye image acquisition module 7 is also provided on the device to be operated 5 and adapted to acquire an image of human eyes (the human eye image). The image processing module 8 is electrically connected to the first human eye image acquisition module 7 and is configured to establish an image coordinate system based on the image of the human eyes acquired by the first human eye image acquisition module 7, and process the image of the human eyes to obtain position coordinates of centers of the two pupils and of the light reflection points in the image coordinate system. The calculation module 9 is electrically connected to the image processing module 8, and is configured to obtain the position information about the fixation point of the human eyes on the device to be operated 5 by a cross ratio invariance algorithm based on the position coordinates of centers of the two pupils and of the light reflection points in the image coordinate system obtained by the image processing module 8. Further, the fixation point acquisition unit 1 of the present embodiment comprises a correction module configured to correct the position information about the fixation point of the human eyes on the device to be operated 5 according to a linear scaling algorithm, so as to obtain a precise position of the fixation point of the human eyes on the device to be operated 5.

It should be further noted that the image processing module 8 and the calculation module 9 in the fixation point acquisition unit 1 in FIG. 3 may be integrated in a respective device to be operated 5.

Figure 4:
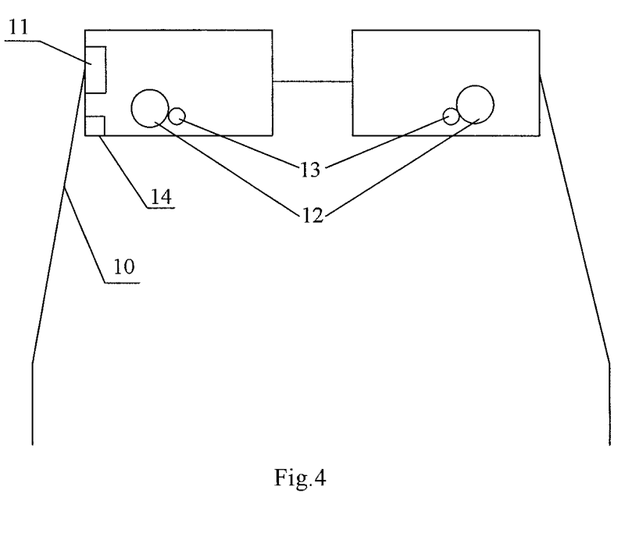
FIG. 4 is a further schematic view of a fixation point acquisition unit in an eye-controlled apparatus according to an embodiment of the present invention.

FIG. 4 is a further schematic view of the fixation point acquisition unit in the eye-controlled apparatus according to an embodiment of the present invention. As shown in FIG. 4, as a further selectable structure of the fixation point acquisition unit in the eye-controlled apparatus according to the present embodiment (the structure is used in a case where the user wears spectacles), the fixation point acquisition unit 1 comprises: spectacles 10; a scene acquisition module 11, a second human eye image acquisition module 12, a fixation direction determination module 13 and a fixation point determination module 14. The scene acquisition module 11 is provided on the spectacles 10 and adapted to acquire a scene image seen by the human eyes through the spectacles 10, wherein the scene image contains an image of the device to be operated 5 (such as, the touch display Screen 4). The second human eye image acquisition module 12 is provided on the spectacles 10 and adapted to acquire an image of the human eyes. The fixation direction determination module 13 is electrically connected to the second human eye image acquisition module 12, and is configured to determine a fixation direction of the human eyes based on the image of the human eyes acquired by the second human eye image acquisition module 12. The fixation point determination module 14 is electrically connected to the scene acquisition module 11 and the fixation direction determination module 13, and is configured to determine the position information about the fixation point of the human eyes on the device to be operated 5 based on the scene image acquired by the scene acquisition module 11 and the fixation direction of the human eyes determined by the fixation direction determination module 13.

Optionally, the fixation direction determination module 13 is further configured to determine the fixation direction of the human eyes based on pupil positions in the image of the human eyes acquired by the second human eye image acquisition module 12.

It should be further noted that the above-mentioned two structures of the fixation point acquisition unit 1 provided by the embodiments of the present invention are only exemplary structure, and the fixation point acquisition unit 1 in a further embodiment of the present invention may also use other devices that may acquire the position information about the fixation point of the human eyes on the device to be operated, such as a naked eye tracker or a wearable eye tracker.

After moving the position of the fixation point on the touch display 4 to the area of the Volume Up key on the touch display screen 4, the user controls the eye to take a preset action, for example, keeping the position of the fixation point of the human eyes on the touch display screen 4 unchanged for 2 to 3 seconds, or, blinking rapidly for 3 to 5 times within a preset time while keeping the position of the fixation point of the human eyes on the touch display screen 4 unchanged. It should be noted that the preset action in the present embodiment is not limited to the above-described two examples, but may be set in accordance with the needs of the user.

When the human eye action detection unit 2 detects the preset action taken by the human eyes, the human eye action detection unit 2 controls the fixation point acquisition unit 1 to transmit current position information about the fixation point of the human eyes on the device to be operated 5 to the control signal generation unit 3. Specifically, the human eye action detection unit 2 controls the fixation point acquisition unit 1 to transmit the current position coordinate $(X_2, Y_2)$ of the fixation point of the human eyes on the device to be operated 5 to the control signal generation unit 3.

It should be noted that the human eye action detection unit 2 in the present embodiment may comprise an apparatus having an imaging function such as a CCD (Charge-Coupled Device). Optionally, the human eye action detection unit 2 in the present embodiment may acquire a real-time image of the human eyes by means of the first human eye image acquisition module 7 or the second human eye image acquisition module 12, and obtain the action of the human eyes based on the real-time image of the human eyes.

After receiving the current position information about the fixation point of the human eyes on the device to be operated 5, the control signal generation unit 3 generates the control signal corresponding to the current position information based on the pre-stored position control correspondence table corresponding to the device to be operated 5. Specifically, the control signal generation unit 3 generates the control signal for Volume Up corresponding to the current position coordinate $(X_2, Y_2)$, based on the position control correspondence table (for example, as shown in FIG. 1) corresponding to the touch display screen 4 and the current position coordinate $(X_2, Y_2)$, and then transmits the control signal for Volume Up to the touch display screen 4.

After receiving the control signal for Volume Up, the touch display screen 4 automatically performs the operation for Volume Up to raise the volume and finishes the eye control process.

The connection between the human eye sight line and the device to be operated 5 may be effectively established by the eye-controlled apparatus provided by the present embodiment, thereby realizing the control to the device to be operated 5 by the human eyes and improving the experience of human-computer interaction.

The present invention further provides an eye-controlled system comprising an eye-controlled apparatus and a plurality of devices to be operated, wherein the eye-controlled apparatus employs an eye-controlled apparatus described in any one of the above-described embodiments, and the detailed description thereof is made referring to the above-mentioned embodiments, and will not be described again herein.

Figure 5:
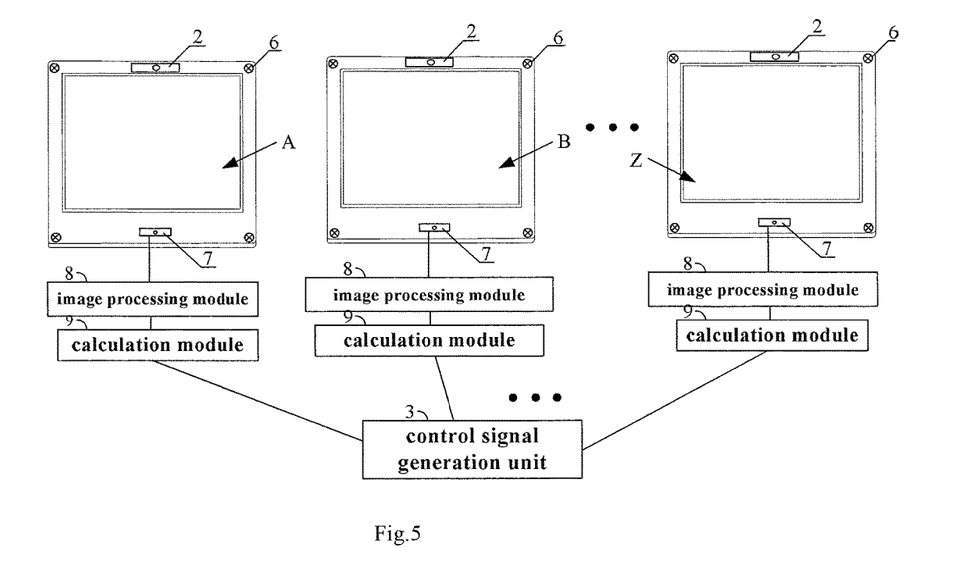
FIG. 5 is a schematic view of an eye-controlled system according to an embodiment of the present invention.

FIG. 5 is a schematic view of an eye-controlled system according to an embodiment of the present invention. As shown in FIG. 5, as an alternative embodiment of the eye-controlled system provided by the embodiment of the present invention, the fixation point acquisition unit 1 in the eye-controlled apparatus of the eye-controlled system uses the fixation point acquisition unit 1 shown in FIG. 3, so as to realize a naked eye control, and the specific structure of the fixation point acquisition unit 1 may be referred to the description of the corresponding contents in the above embodiment, and will not be described again herein. The eye-controlled system as shown in FIG. 5 comprises a plurality of devices to be operated (e.g., the device to be operated A, the device to be operated B, . . . , the device to be operated Z), the devices to be operated in the eye-controlled apparatus have the same number as that of the fixation point acquisition units 1, and are one-to-one corresponding to the fixation point acquisition units 1; and each fixation point acquisition unit 1 is provided on a respective device to be operated so as to acquire the position information about the fixation point of the human eyes on the respective device to be operated 5 when the user is performing the eye control.

In the present embodiment, all of the fixation point acquisition units 1 are electrically connected to a same control signal generation unit 3, and the control signal generation unit 3 is configured to store a plurality of position control correspondence tables corresponding to the devices to be operated, respectively, (that is, the position control correspondence tables have a same number as that of the number of the devices to be operated, and are one-to-one corresponding to the devices to be operated), and to transmit the control information to each devices to be operated.

Optionally, in the present embodiment, the human eye action detection units 2 in the eye-controlled apparatus have the same number as that of the devices to be operated, and are one-to-one corresponded to the devices to be operated; and each human eye action detection units 2 is provided on a respective device to be operated so as to acquire the image of the human eyes in front of the respective device to be operated and detect whether the user makes the preset action based on the image of the human eyes when the user is performing the eye control.

The operation of the eye-controlled system provided by the embodiment of the present invention, taking that the user is to control the device B to be operated as shown in FIG. 5 in the naked eye control way as an example, will be described in detail hereinafter.

When operating the device B, the user moves to the position just facing the device B and move the position of the fixation point of the eye on the device B to an area of a certain key (soft key and physical key) to be operated on the device B, and then control the eyes to take the preset action. At this time, the fixation point acquisition unit 1 provided on the device B may acquire the position information about the fixation point of the human eyes on the device B (the fixation point acquisition unit 1 on the other devices cannot detect the position information about the fixation point of the human eyes thereon). The human eye action detection unit 2 corresponding to the device B may detect that the human eyes have taken a preset action with respect to the device B, and the human eye action detection unit 2 corresponding to the device B controls the fixation point acquisition unit 1 on the device B to transmit the current position information about the fixation point of the human eyes on the device t B to the control signal generation unit 3. After receiving the current position information transmitted from the fixation point acquisition unit 1 on the device B, the control signal generation unit 3 calls the position control correspondence table corresponding to the device B, generates the control signal corresponding to the current position information and adapted to control the device B, based on the received current position information and the called position control correspondence table corresponding to the device B, and transmits the control signal to the device B so as to control the device B to execute a corresponding operation.

It should be noted that in the eye-controlled system of FIG. 5, the human eye action detection unit 2 may acquire a real-time image of the human eyes by means of the first human eye image acquisition module 7, and obtain the action of the human eyes based on the real-time image of the human eyes, and then detect whether the human eyes have taken the preset action with respect to the device corresponding to the human eye action detection unit 2.

Figure 6:
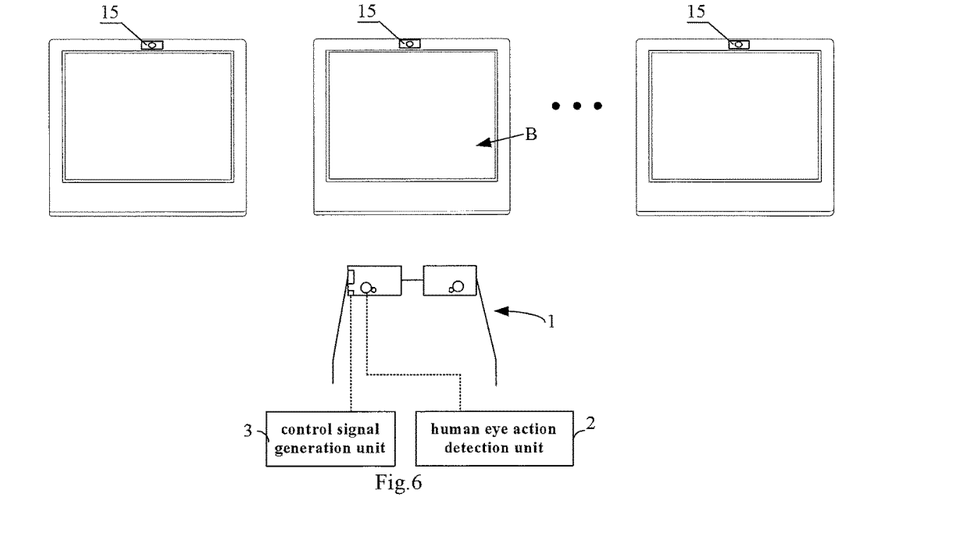
FIG. 6 is a further schematic view of an eye-controlled system according to an embodiment of the present invention.

FIG. 6 is a further schematic view of an eye-controlled system according to an embodiment of the present invention. As shown in FIG. 6, as a further alternative embodiment of the eye-controlled system provided by the embodiment of the present invention, the fixation point acquisition unit 1 in the eye-controlled apparatus of the eye-controlled system may use the fixation point acquisition unit 1 shown in FIG. 4, so as to realize a wearable eye control, and the specific structure of the fixation point acquisition unit 1 may be referred to the description of the corresponding contents in the above embodiment, and will not be described again herein. The eye-controlled system as shown in FIG. 6 comprises a plurality of devices to be operated (e.g., the device to be operated A, the device to be operated B . . . the device to be operated Z), and the eye-controlled apparatus comprises only one the fixation point acquisition unit 1. The eye-controlled system further comprises: a plurality of activation units 15 having the same number as that of the devices to be operated and one-to-one corresponding to the devices to be operated, and each activation units 15 is provided on a respective device to be operated. Each activation units 15 is configured to activate the eye-controlled apparatus when the fixation point acquisition unit 1 is directed to a device to be operated corresponding to the activation unit 15, and control the control signal generation unit 3 to call a position control correspondence table corresponding to the device to be operated corresponding to the activation unit 15.

Optionally, in the present embodiment, the eye-controlled apparatus comprises one human eye action detection unit 2 provided on the spectacles 10 of the fixation point acquisition unit 1.

The operation of the eye-controlled system provided by the embodiment of the present invention, in which the user will control the device B to be operated as shown in FIG. 6 in the wearable eye control way, will be described in detail hereinafter.

When operating the device B, the user wears the spectacle type fixation point acquisition unit 1 (at this time, the whole eye-controlled apparatus are in non-work status), and move to the position just facing the device and move the position of the fixation point of the eye on the device B to the area of a certain key (soft key and physical key) to be operated on the device B, and then control the eyes to take the preset action. At this time, the activation unit 15 provided on the device B detects that the fixation point acquisition unit 1 is just facing the device, and then activates the eye-controlled apparatus, that is, the eye-controlled apparatus is started to work, and controls the control signal generation unit 3 to call a position control correspondence table corresponding to the device. Meanwhile, since the fixation point acquisition unit 1 and the human eye action detection unit 2 in the eye-controlled apparatus begin to work, the fixation point acquisition unit 1 may acquire the position information about the fixation point of the human eyes on the device B, and the human eye action detection unit 2 may detect that the human eyes have taken a preset action, and control the fixation point acquisition unit 1 to transmit the current position information about the fixation point of the human eyes on the device B to the control signal generation unit 3. After receiving the current position information about the fixation point of the human eyes on the device B transmitted from the fixation point acquisition unit 1, the control signal generation unit 3 generates the control signal corresponding to the received current position information, based on the received current position information and the previously called position control correspondence table corresponding to the device B, and then transmits the control signal to the device so as to control the device B to execute a corresponding operation.

It should be noted that in the eye-controlled system as shown in FIG. 6, the human eye action detection unit 2 may be wirelessly connected to the second human eye image acquisition module 12, and acquire the real-time image of the human eyes by means of the second human eye image acquisition module 12, and obtain the action of the human eyes based on the real-time image of the human eyes, and then detect whether the human eyes have taken the preset action with respect to the facing device to be operated. Certainly, the control signal generation unit 3 in the present embodiment may also be wirelessly connected to the fixation point determination module 14 in the fixation point acquisition unit 1 (see FIG. 4) so as to receive the position information transmitted from the fixation point determination module 14.

The eye-controlled system provided by the embodiment of the present invention has a simple structure and may control the plurality of devices to be operated by using only one control signal generation unit, such that the cost of the entire eye-controlled system may be greatly reduced.

Figure 7:
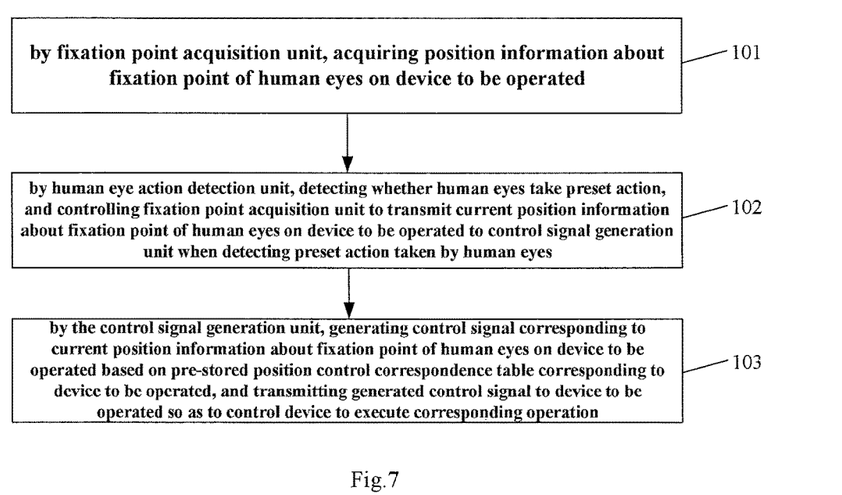
FIG. 7 is a flow chart of an eye-controlled method according to an embodiment of the present invention.

FIG. 7 is a flow chart of an eye-controlled method according to an embodiment of the present invention. As shown in FIG. 7, the eye-controlled method is based on the eye-controlled apparatus provided by the above-mentioned embodiments, and the specific structure of the eye-controlled apparatus may be referred to the description in the above embodiment, and will not be described again herein. The eye-controlled method comprises the following steps:

Step 101: by the fixation point acquisition unit, acquiring the position information about the fixation point of the human eyes on the device to be operated;

Step 102: by the human eye action detection unit, detecting whether the human eyes take the preset action, and controlling the fixation point acquisition unit to transmit the current position information about the fixation point of the human eyes on the device to be operated to the control signal generation unit when detecting the preset action taken by the human eyes;

Step 103: by the control signal generation unit, generating the control signal corresponding to the current position information about the fixation point of the human eyes on the device to be operated based on the pre-stored position control correspondence table corresponding to the device to be operated, and transmitting the generated control signal to the device to be operated so as to control the device to execute a corresponding operation.

It should be noted that the position information on the device to be operated and the control signals corresponding to the position information, respectively, are stored in the position control correspondence table.

In an embodiment, before step 101, the eye-controlled method further comprises the step of establishing the position control correspondence table corresponding to the device to be operated.

In the eye-controlled method of the embodiments of the present invention, firstly the fixation point acquisition unit acquires the position information about the fixation point of the human eyes on the device to be operated; next, the human eye action detection unit detects whether the human eyes perform the preset action, and control the fixation point acquisition unit to transmit the current position information about the fixation point of the human eyes on the device to be operated to the control signal generation unit when detecting the preset action taken by the human eyes; and finally the control signal generation unit generates the control signal corresponding to the current position information about the fixation point of the human eyes on the device to be operated based on the position control correspondence table corresponding to the device to be operated, and transmits the generated control signal to the device to be operated so as to control the device to execute a corresponding operation, such that the human eyes may control the device.

It should be understood that the above embodiments are merely illustrative embodiments for the purpose of illustrating the principles of the invention, but the invention is not limited thereto. It will be apparent to those skilled in the art that various changes and modifications can be made therein without departing from the spirit and spirit of the invention, which are also considered to be within the scope of the present invention.

What is claimed is:

1. An eye-controlled apparatus, comprising:
A fixation point acquisition unit configured to acquire position information about a fixation point of human eyes on a device to be operated;
a human eye action detection unit configured to detect whether the human eyes take a pre-set action, and control the fixation point acquisition unit to output current position information about the fixation point of the human eyes on the device to be operated when detecting the preset action taken by the human eyes; and
a control signal generation unit configured to generate, based on a pre-stored position control correspondence table corresponding to the device to be operated, a control signal corresponding to the current position information about the fixation point of the human eyes on the device to be operated, and transmit the control signal to the device to be operated so as to control the device to execute a corresponding operation,
wherein position information on the device to be operated and the control signals corresponding to position information are stored in the position control correspondence table, respectively,
wherein the fixation point acquisition unit comprises:
an infrared emission module provided on the device to be operated and adapted to emit infrared light to the human eyes and form light reflection points in two pupils of the human eyes;
a first human eye image acquisition module provided on the device to be operated and adapted to acquire an image of the human eyes;
an image processing module configured to establish an image coordinate system based on the image of the human eyes acquired by the first human eye image acquisition module, and process the image of the human eyes to obtain position coordinates of centers of the two pupils and of the light reflection points in the image coordinate system; and
a calculation module configured to obtain the position information about the fixation point of the human eyes on the device to be operated by a cross ratio invariance algorithm based on the position coordinates of centers of the two pupils and of the light reflection points in the image coordinate system obtained by the image processing module.

2. The eye-controlled apparatus according to claim 1, wherein the infrared emission module comprises four infrared emission sources provided at four corners of the device to be operated, respectively.

3. The eye-controlled apparatus according to claim 1, wherein the fixation point acquisition unit further comprises a correction module configured to correct the position information about the fixation point of the human eyes on the device to be operated according to a linear scaling algorithm.

4. The eye-controlled apparatus according to claim 1, wherein the image processing module and the calculation module are integrated in the device to be operated.

5. An eye-controlled apparatus, comprising:
A fixation point acquisition unit configured to acquire position information about a fixation point of human eyes on a device to be operated;
a human eye action detection unit configured to detect whether the human eyes take a pre-set action, and control the fixation point acquisition unit to output current position information about the fixation point of the human eyes on the device to be operated when detecting the preset action taken by the human eyes; and
a control signal generation unit configured to generate, based on a pre-stored position control correspondence table corresponding to the device to be operated, a control signal corresponding to the current position information about the fixation point of the human eyes on the device to be operated, and transmit the control signal to the device to be operated so as to control the device to execute a corresponding operation,
wherein position information on the device to be operated and the control signals corresponding to position information are stored in the position control correspondence table, respectively,
wherein the fixation point acquisition unit comprises:
spectacles;
a scene acquisition module provided on the spectacles and adapted to acquire a scene image seen by the human eyes through the spectacles, the scene image containing an image of the device to be operated;

a second human eye image acquisition module provided on the spectacles and adapted to acquire an image of the human eyes, a fixation direction determination module configured to determine a fixation direction of the human eyes based on the image of the human eyes acquired by the second human eye image acquisition module; and a fixation point determination module configured to determine the position information about the fixation point of the human eyes on the device to be operated based on the scene image acquired by the scene acquisition module and the fixation direction of the human eyes determined by the fixation direction determination module.

6. The eye-controlled apparatus according to claim 5, wherein the fixation direction determination module is configured to determine the fixation direction of the human eyes based on pupil positions in the image of the human eyes acquired by the second human eye image acquisition module.

7. The eye-controlled apparatus according to claim 1, wherein the preset action comprises keeping the position of the fixation point of the human eyes on the device to be operated unchanged for 2 to 3 seconds, or, blinking rapidly for 3 to 5 times within a preset time while keeping the position of the fixation point of the human eyes on the device to be operated unchanged.

8. The eye-controlled apparatus according to claim 1, wherein the human eye action detection unit is an apparatus having an imaging function.

9. The eye-controlled apparatus according to claim 1, wherein the human eye action detection unit is configured to acquire a real-time image of the human eyes by the first human eye image acquisition module, and obtain the action of the human eyes based on the real-time image of the human eyes.

10. An eye-controlled system comprising: a plurality of devices to be operated and an eye-controlled apparatus according to claim 1.

11. The eye-controlled system according to claim 10, wherein the fixation point acquisition units in the eye-controlled apparatus have the same number as that of the devices to be operated, and are one-to-one corresponding to the devices to be operated; and wherein each fixation point acquisition units is provided on a respective device to be operated.

12. The eye-controlled system according to claim 11, wherein the human eye action detection units in the eye-controlled apparatus have the same number as that of the devices to be operated, and are one-to-one corresponding to the devices to be operated; and each human eye action detection units is provided on a respective device to be operated.

13. The eye-controlled system according to claim 11, wherein all of the fixation point acquisition units are connected to one single control signal generation unit, the control signal generation unit being adapted to store a plurality of position control correspondence tables corresponding to the devices to be operated, respectively, and transmit control information to each device to be operated.

14. An eye-controlled method using the eye-controlled apparatus according to claim 1, comprising steps of:

by a fixation point acquisition unit, acquiring the position information about the fixation point of the human eyes on the device to be operated;

by a human eye action detection unit, detecting whether the human eyes take the preset action, and controlling the fixation point acquisition unit to transmit the current position information about the fixation point of the human eyes on the device to be operated to a control signal generation unit when detecting the preset action taken by the human eyes; and by the control signal generation unit, generating the control signal corresponding to the current position information about the fixation point of the human eyes on the device to be operated based on the pre-stored position control correspondence table corresponding to the device to be operated, and transmitting the generated control signal to the device to be operated so as to control the device to execute a corresponding operation, wherein the position information on the device to be operated and the control signals corresponding to the position information, respectively, are stored in the position control correspondence table.

15. The eye-controlled method according to claim 14, further comprising a step of:

prior to acquiring the position information about the fixation point of the human eyes on the device to be operated by the fixation point acquisition unit, establishing the position control correspondence table corresponding to the device to be operated.

16. The eye-controlled apparatus according to claim 5, wherein the human eye action detection unit is configured to acquire a real-time image of the human eyes by the second human eye image acquisition module, and obtain the action of the human eyes based on the real-time image of the human eyes.

17. An eye-controlled system comprising: a plurality of devices to be operated and an eye-controlled apparatus according to claim 5.

18. The eye-controlled system according to claim 17, wherein the eye-controlled apparatus comprises one fixation point acquisition unit, and wherein the eye-controlled system further comprises a plurality of activation units one-to-one corresponding to the devices to be operated, each activation units being provided on a respective device to be operated, and configured to activate the eye-controlled apparatus when the fixation point acquisition unit is directed to a device to be operated corresponding to the activation unit and control the control signal generation unit to call the position control correspondence table corresponding to the device to be operated corresponding to the activation unit.

19. The eye-controlled system according to claim 18, wherein the eye-controlled apparatus comprises one human eye action detection unit provided on spectacles of the fixation point acquisition unit.

* * * * *